United States Patent
Omann

(10) Patent No.: US 6,209,236 B1
(45) Date of Patent: Apr. 3, 2001

(54) ACTUATED MATERIAL LOADER WITH OPEN FENCE

(76) Inventor: Lawrence F. Omann, 39947 95th Ave., St. Joseph, MN (US) 56374

( * ) Notice: Subject to any disclaimer, the term of this patent is extended or adjusted under 35 U.S.C. 154(b) by 0 days.

(21) Appl. No.: 09/442,357

(22) Filed: Nov. 17, 1999

(51) Int. Cl.[7] .............................. A01A 15/02; E02F 3/28
(52) U.S. Cl. .............................. 37/405; 37/444; 37/903; 414/722; 414/912
(58) Field of Search ............................ 37/410, 405, 903, 37/407, 409, 445, 403, 444; 171/132; 414/724, 723, 722, 912, 725, 726

(56) References Cited

U.S. PATENT DOCUMENTS

| | | |
|---|---|---|
| D. 361,772 | 8/1995 | Hulsey . |
| 2,491,079 | 12/1949 | Bestland . |
| 2,597,374 | 5/1952 | Richey . |
| 2,617,210 | 11/1952 | Thebiay . |
| 2,635,884 | 4/1953 | Christiansen . |
| 3,003,265 | 10/1961 | Lutjens . |
| 3,082,828 | 3/1963 | Schindelko . |
| 3,100,540 | 8/1963 | Deaver et al. . |
| 3,307,277 | 3/1967 | Kondracki . |
| 3,557,877 | 1/1971 | Hoffman . |
| 3,596,764 | 8/1971 | Smith . |
| 3,643,821 | 2/1972 | Viel . |
| 3,765,490 | 10/1973 | Logue . |
| 4,303,507 | 12/1981 | Smith . |
| 4,411,585 | 10/1983 | Quinn . |
| 4,729,180 | 3/1988 | Hendricks . |
| 4,790,717 | 12/1988 | Anderson . |
| 5,027,906 | 7/1991 | Jeannotte et al. . |
| 5,241,764 | 9/1993 | Modig . |
| 5,564,885 | 10/1996 | Staben, Jr. . |
| 5,664,348 | 9/1997 | Omann . |

*Primary Examiner*—Christopher J. Novosad
(74) *Attorney, Agent, or Firm*—Albert W. Watkins

(57) ABSTRACT

A rock picker and material loader attachment is pivotally mounted to a loader scoop or bucket and extends longitudinally forward therefrom. A plurality of teeth form the leading surface of the attachment during digging and loading operations. Parallel, relatively planar plates form the structural support for the plurality of teeth, will simultaneously acting as a debris catcher and allowing an operator to view the teeth while engaging material through the debris catcher. An adjustable support is used in combination with a small, easy-to-use wedge, to control and adjust the characteristics of rotation of the attachment relative to a scoop or bucket. A two speed hydraulic cylinder may also be used as the primary mover to effect the rotation of the attachment. The attachment is useful for rocks, manure, trash, bales and other materials.

10 Claims, 7 Drawing Sheets

ACTUATED MATERIAL LOADER WITH OPEN FENCE

BACKGROUND OF THE INVENTION

1. Field of the Invention

This invention pertains to excavating, earth working and material handling equipment generally, and specifically to loader scoop or bucket attachments that are designed for efficient rock picking or for material loading, and transport of either.

2. Description of the Related Art

Many industries use front-end loaders and tractors, which are highly versatile machines. Generally configured with a front end bucket, these machines are capable of transporting many thousands of pounds of materials. Most loaders are capable of maneuvering about in relatively small spaces, further adding to their versatility. The bucket is useful for scooping from large piles or smooth surfaces, and so may be used not only for moving materials about but also for cleaning up surfaces.

However, a standard bucket has a lateral leading edge which is difficult to use for irregular materials such as logs or pallets. Further limiting a front-end loader is the relative difficulty of using the bucket for digging into dense or packed materials such as the earth, or scraping the irregular ground. Recognizing these limitations of a scoop or bucket, and yet also understanding the vast potential for these compact and powerful machines, previous inventors have designed alternative attachments for front-end loaders. Among the inventions are those illustrated in U.S. Pat. No. 3,557,877 to Hoffman, U.S. Pat. No. 3,643,821 to Viel, and U.S. Pat. No. 4,303,507 to Smith, the teachings of each incorporated herein by reference.

Hoffman discloses an attachment, referred to as a picker head, for a tractor or the like. The picker head, which replaces the standard bucket, consists of a plurality of longitudinal, parallel teeth. The teeth are spaced from each other, which improves penetration of the earth and also ensures that any dirt which is gathered with rock will drop back to the earth and not be retained in the picker head. The picker head may also be used to scrape along the irregular earth surface to sift rocks from any loose top soil.

Viel discloses an attachment similar to Hoffman, and, like Hoffman, discloses the rock picker as a replacement for the bucket. Like Hoffman, the Viel design discloses a plurality of longitudinal, parallel teeth for picking rocks. In the Viel design, the tractor hydraulics are used to move and orient the rock picker attachment. Neither Hoffman or Viel provide a way to pick rocks or other debris, load, and then continue to pick. Rather, in the Hoffman and Viel designs, the picker attachment is used as a replacement for the loader bucket. Where a large number of rocks or several very large rocks or other debris need loaded, the lack of a loader bucket is a distinct disadvantage.

Several additional disadvantages exist in the Viel and Hoffman designs. The use of the picker head as the debris carrying structure limits the operator to only one type of debris in a load. For example, brush or fallen logs and rocks may both need to be removed from a location. The brush will normally be unloaded in one place, such as for burning, composting, etc., while rocks will normally be deposited elsewhere.

Furthermore, the picker head is designed for picking, not for holding material. The picker head is flat, with no side walls. A loader bucket has deep side walls designed for retaining material in the bucket. When hauling rock or other debris, very little may be carried directly on the picker head without dropping therefrom. Being able to transfer the material to some other container such as the loader bucket for transport would be a distinct advantage.

Another disadvantage of the Hoffman and Viel designs occurs during unloading. Directly controlling the attachment with hydraulics or cables limits how fast the attachment may be moved.

Some materials are more difficult to remove, and so may not be adequately unloaded by the Hoffman and Viel designs.

Smith discloses a scraper sifter which hangs from a bucket by chains. The chains provide a lost-motion connection, allowing the bucket to float over surface irregularities in the ground. However, due also to the chain connection, the Smith invention is unable to be used for digging.

Other attachments and free-standing rock pickers are illustrated in U.S. Pat. Nos. 2,491,079, 2,617,210, 3,082, 828, 3,100,540, 3,596,764, 4,411,585, 4,729,180, and D361, 772, the teachings of each incorporated herein by reference. Nevertheless, none of these prior-art rock pickers have met each of the needs of agriculture.

In my U.S. Pat. No. 5,664,348, also incorporated herein by reference, I disclose a rock picker which addresses many of the needs which were previously wanting. In that patent, I disclose a toothed rock picker which may be readily attached to an existing front-end loader. The rock picker is actuated without the need for special hydraulics, and includes a solid fence for retaining debris or other matter in the loader. By virtue of the novel construction, a wide range of sizes and types of materials may be handled successfully. Nevertheless, certain disadvantages of that design have been noted. In particular, the use of a solid fence restricts visibility during picking and loading operations. Furthermore, for some applications, is desirable to be able to retrofit hydraulic controls. Finally, in some applications it may be preferable for the material loader to be operated from a fixed position, rather than allow the material loader to rotate.

SUMMARY OF THE INVENTION

In a first manifestation, the invention is a hydraulically actuated material loader attachment movably mounted to a loader bucket for loading material from a surface or within a conglomeration. A means pivotally attaches to the loader bucket. A leading edge distal to the loader bucket is used to engage with the material, and a debris catcher for retaining debris in the bucket during material loading is adjacent the loader bucket. A material support between leading edge and support bar supports material during loading. A two speed hydraulic cylinder connected between loader bucket and material loader rotates the material loader relative to loader bucket. The two speed hydraulic cylinder rotates the material loader at a first angular velocity when in a first orientation for loading material and at a second greater angular velocity when the material loader is between the first orientation and a second orientation for unloading. The material loader may be adjusted at the slower first angular velocity to facilitate correct angular positioning relative to a surface, while the faster second angular velocity is sufficient to unload material from the material loader into the bucket.

In the second manifestation, the invention is an attachment for loading and unloading material in and out of a front-loader bucket controlled by an operator, while maintaining material in full view of the operator when the operator is facing forward. A plurality of elongated teeth extend forward from the front-loader bucket, and a support extends transverse to the plurality of elongated teeth. A plurality of relatively planar sheets are spaced equidistantly along a support and have individual elongated teeth positioned between the sheets. The relatively planar sheets extend parallel to the elongated teeth, edge-wise to full view of the operator, and the support extends normal to the sheets. The plurality of relatively planar sheets provide support for elongated teeth and form a barrier cooperatively with the front-loader bucket, while maintaining full view.

In a third manifestation, the invention is a rock picker, diverse material loader and excavating attachment for a scoop. The attachment includes a means for gathering and supporting material, having a first axial support rod extending along a first axis for rigidly supporting said gathering means. A bracket extends about the first axial support and retains the first axial support to scoop while allowing rotation of support and gathering means about the first axis. A first means limits rotation in a first direction about the first axis; a second means limits rotation in a second direction opposite the first direction, and a third means prevents rotation of gathering means completely. A means for selectively positioning the first axial support relative to bracket enables or disables the third means.

OBJECTS OF THE INVENTION

A first object of the present invention is to allow continuous rock digging and loading, until the capacity of the loader bucket is reached. A second object of the invention is to allow easy and quick modification of existing equipment to accommodate the attachment and thereby make the equipment more versatile. A third object of the invention is to ensure easy maintenance of the attachment. Another object of the invention is to allow a loader to load as many diverse materials as possible, including rock, manure, logs and trees, hay bales and other baled material, trash, and others. A further object of the invention is to allow a standard attachment to fit a variety of loaders and tractors. An additional object is to enable rapid motion in the attachment during unloading. Yet another object of the invention is to enable clear view of the surface which is being worked, or the material being loaded. Yet a further object of the invention is to enable ready attachment of hydraulic cylinder to control actuation. Another object of the invention is to allow the material loader to be preset to either rotate or remain fixed relative to the bucket. These and other objects are achieved by the preferred embodiment of the invention, as described hereinbelow.

DESCRIPTION OF THE PREFERRED EMBODIMENT

Figure 1:
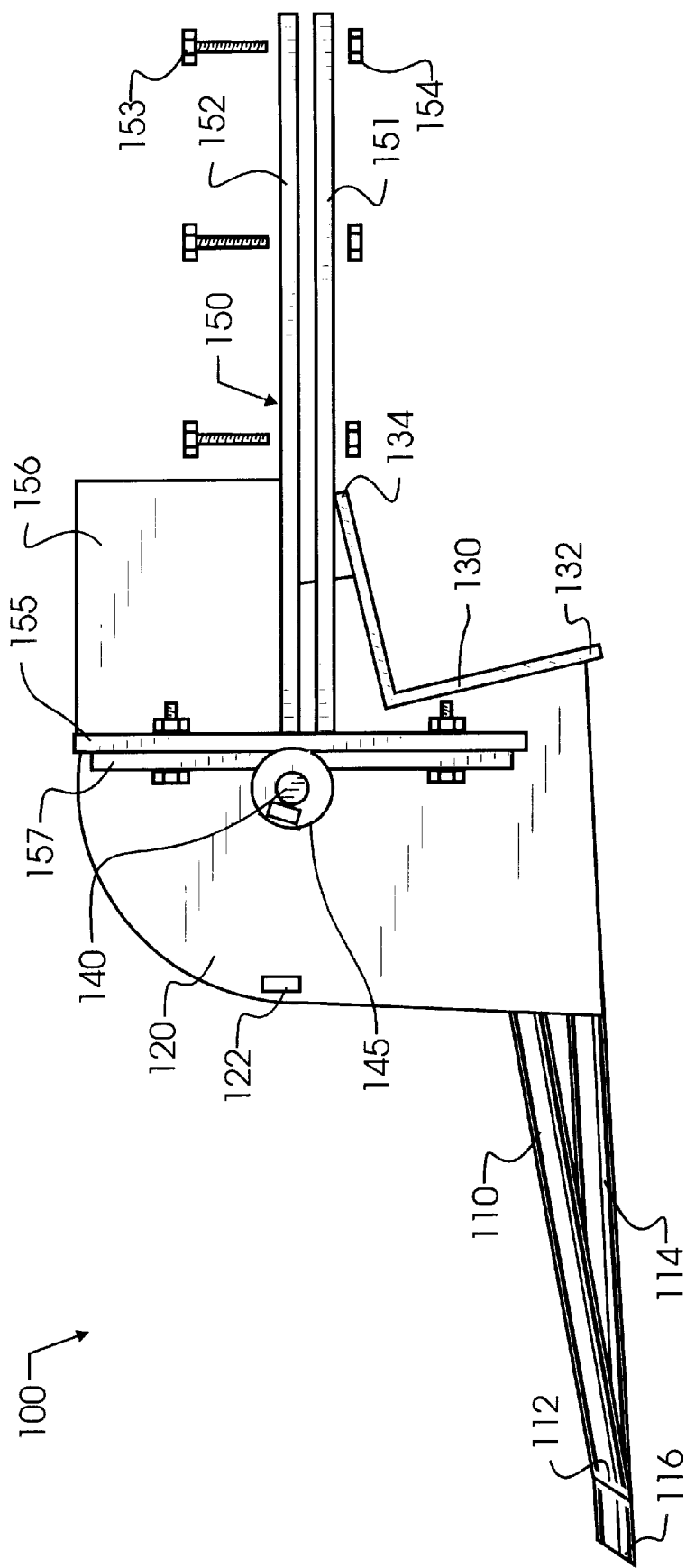
FIG. 1 illustrates a loader attachment designed in accord with the invention from a side view, with the attachment in a material collecting position.

FIGS. 1–6 illustrate a first preferred embodiment actuated material loader 100 with open fence from various views. The primary material support surface is formed from an array of rods 114 which terminate in slightly sloped tips 116. Forming mild edges about the primary material support surface created by the array of rods 114 are two non-parallel rods 110 which terminate in slightly sloped tips 112. As may be best seen in FIG. 4, each of the rods 114 are spaced by a small distance sufficient to allow small gravel and dirt to pass through. Larger materials which might otherwise tend to roll off the tops of rods 114 are held towards the center by the slightly elevated outside rods 110. Rods 110 are received and held in place in socket 111. Socket 111 may have threads, screw retainers, bolts, rivets, thermally expandable sleeves or other appropriate means for retaining rods 110 in place. Sockets 115 are similarly provided to retain rods 114 in place. Each of the sockets 111,115 are securely anchored to large plates 120. In the most preferred embodiment, these plates 120 may be fabricated from sheet metal such as steel. Plates 120 might, for example, be stamped or cut from much larger sheets stock. Within a more central region of each plates 120, a hole has also been provided through which a supporting rod 140 passes. Where plates 120 are fabricated from sheet steel, they might, for example, be attached to supporting rod 140 by either a small or complete weld.

Figure 4:
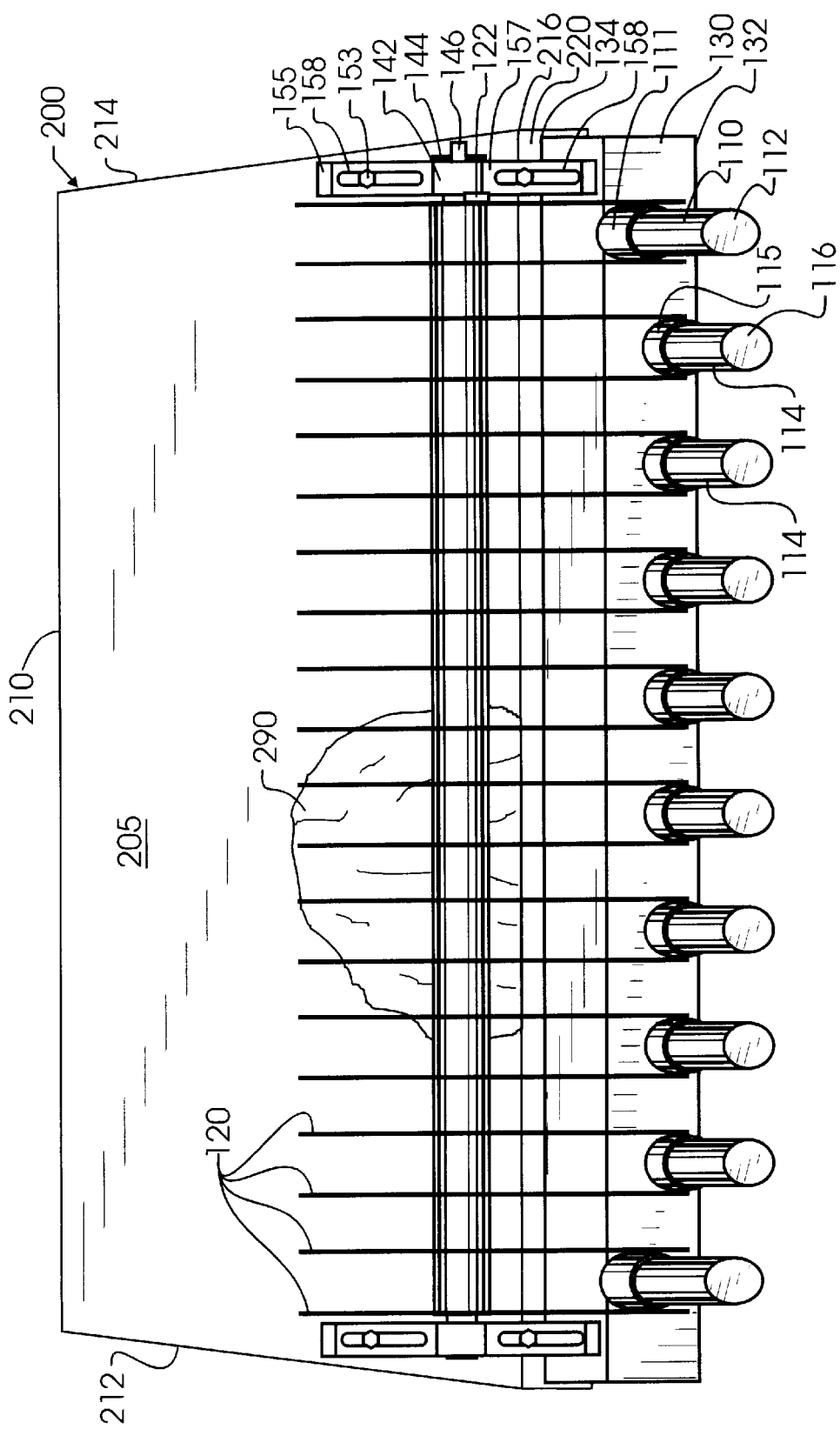
FIG. 4 illustrates the loader attachment of FIG. 1 from front view attached to a front loader or scoop.

Attachment 100 is mounted on to a scoop or bucket, such as bucket 200 illustrated in FIG. 4, by an attaching means 150, through the attachment of two pairs of similar strips 151, 152 which attach to a bottom outside and inside, respectively, of bucket 200. While a variety of techniques for attachment will be suitable and apparent to those skilled in the art, in the most preferred embodiment illustrated in FIG. 1 bolts 153 are used cooperatively with nuts 154 to provide a firm, and still removable, means of attachment. Strips 151, 152 provided a strong rigid anchor for T-bar 155. Engaged with T-bar 155 is adjustable support 157. As best seen in FIG. 4, adjustable support 157 includes elongated slots 158 through which screws 153 pass. By virtue of the extended slots 158, adjustable support 157 may be raised or lowered relative to T-bar 155 and mounting strips 151, 152.

As can be best seen from FIG. 1, a rotational stop 130 is securely fastened to plates 120. In operation, plates 120 and support rod 140 are designed to be capable of rotation relative to adjustable support 157, T-bar 155, and strips 151, 152. Edge 134 limits the extent of rotation in a counter clockwise direction, as seen in FIG. 1, by contacting the bottom side of strips 151. Rotation of teeth 110, 114, and plates 120 is limited in the clockwise direction by stop 122, which will engage either adjustable support 157 or T-bar 155. Reinforcement plate 156 is fixed in position and might, for example, be welded to strip 152 and T-bar 155. Plates 156 provides additional structural support to T-bar 155 in the event substantial torque is applied thereto.

Figure 2:
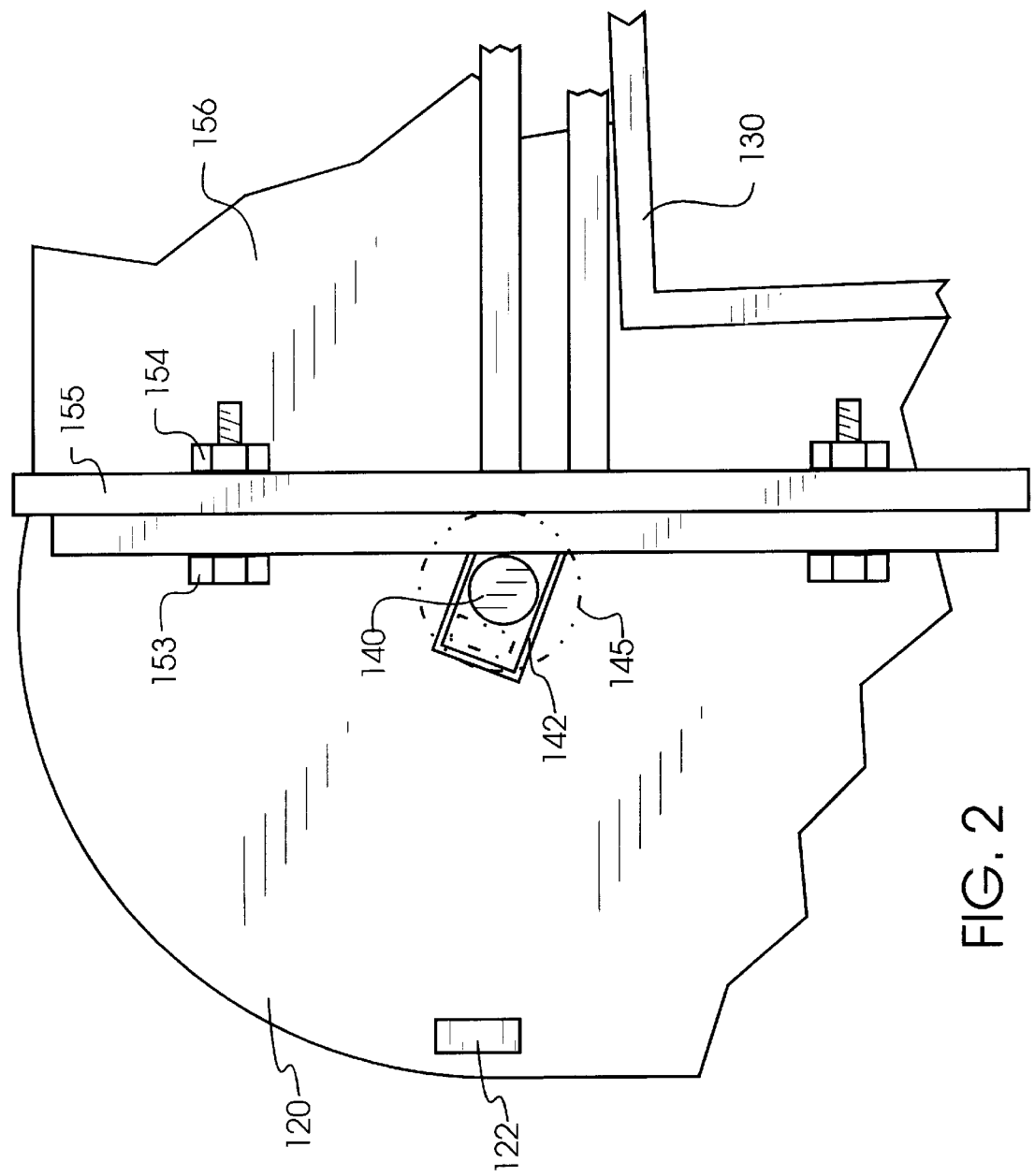
FIG. 2 illustrates the loader attachment of FIG. 1 from an enlarged, partial side view.
Figure 3:
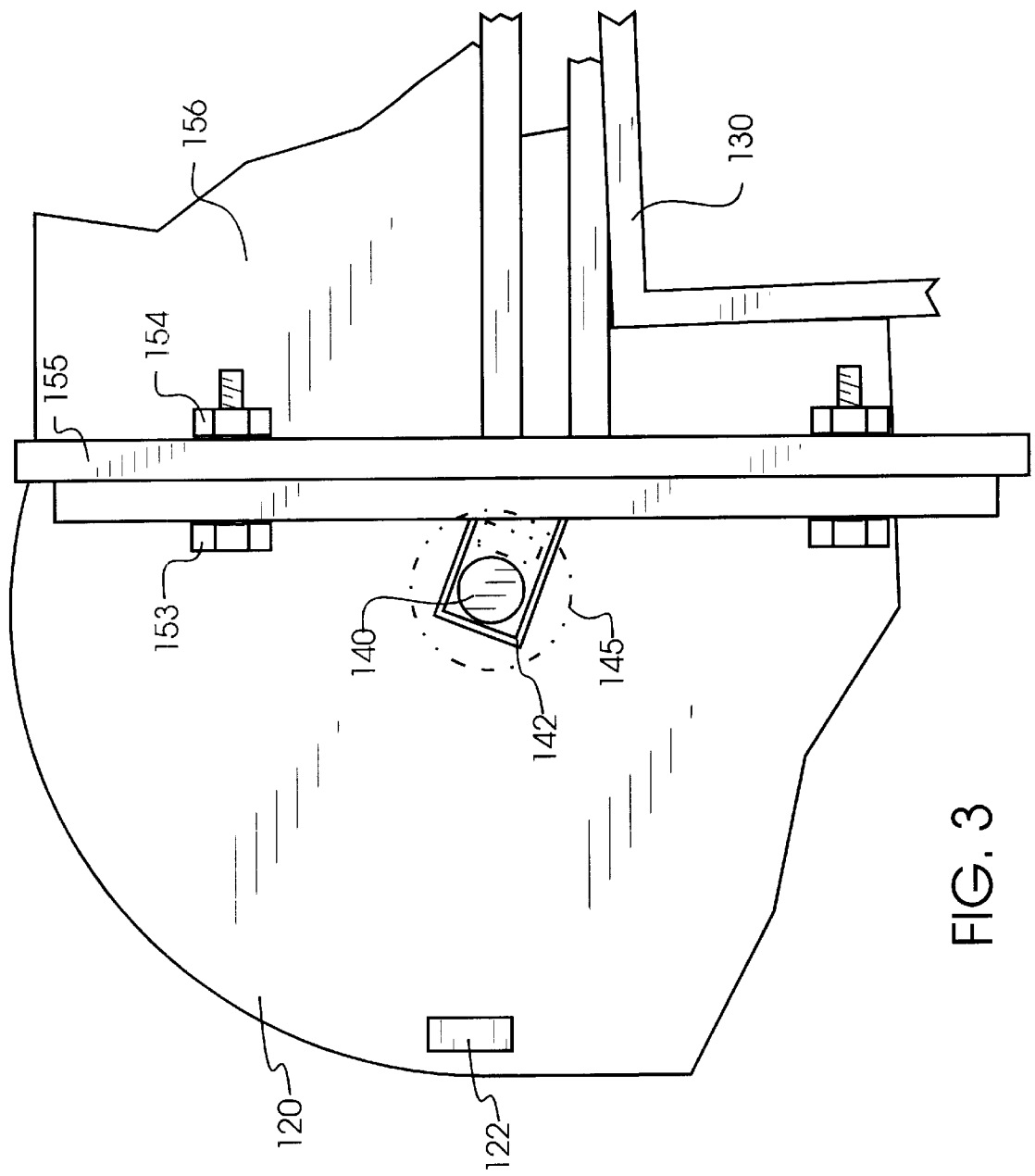
FIG. 3 illustrates an alternative arrangement of the loader attachment of FIG. 2.
Figure 6:
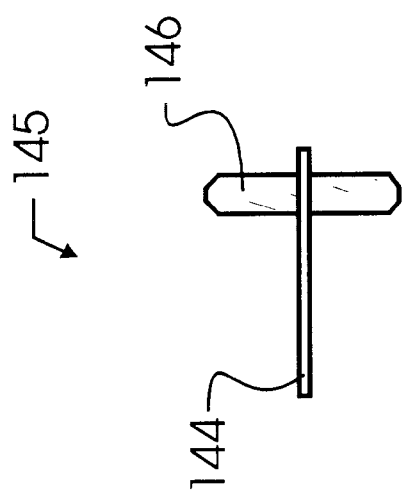
FIG. 6 illustrates the spacer of FIG. 5 from a side view.
Figure 5:
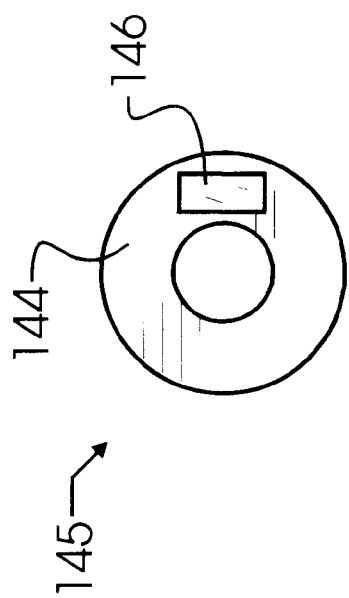
FIG. 5 illustrates the spacer which controls rotation of the attachment.

FIGS. 2 and 3 illustrate by enlarged partial view the alternative placements of shaft 140 relative to bushing sleeve 142, using spacer 145. FIGS. 5 and 6 provide side and edge views of spacer 145. A large flat washer 144 includes a flat strip or wedge 146 extending in one or both directions from flat washer 144. While not specifically illustrated, it will be understood to those skilled in the art that a cotter pin or other retention device will be used in combination with washer 144 to retain support rod 140 and flat washer 144 in place respectively within and adjacent bushing support 142. Depending upon placement of spacer 145, support rod 140 may be positioned adjacent adjustable support 157, as shown in FIG. 2. In an alternative placement, as shown in FIG. 3, spacer 145 is rotated about 180 degrees, with wedge 146 separating support rod 140 from adjustable support 157.

Figure 7:
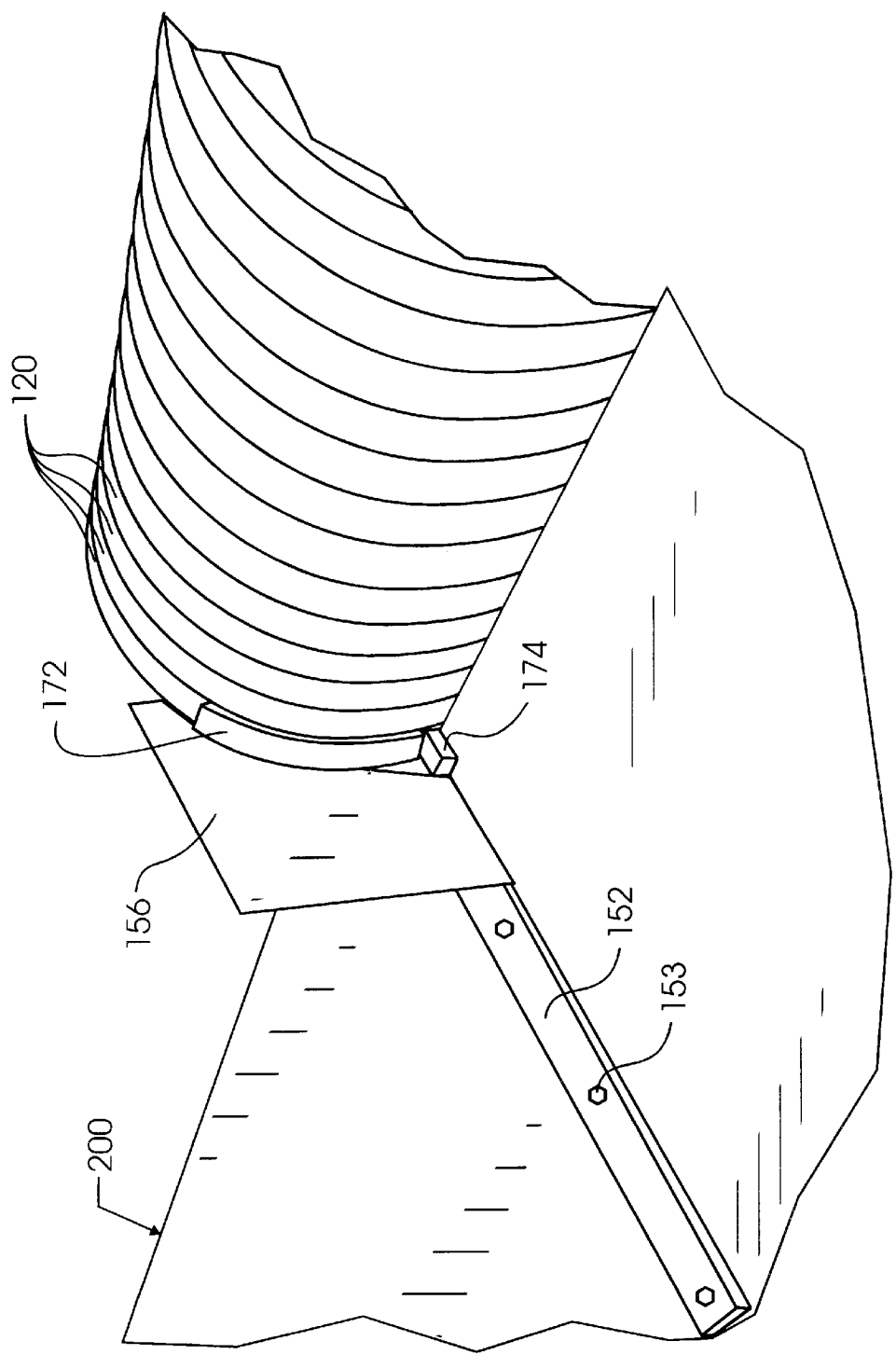
FIG. 7 illustrates the loader attachment of FIG. 1 from inside the scoop.

The significance of the placement of wedge 146 with respect to support rod 140 and adjustable support 157 is best understood when considered in conjunction with FIG. 7. FIG. 7 provides an interior view of bucket 200 looking towards attachment 100. From this viewing angle stop 172 and block 174 are visible. Stop 172 may be formed integrally with one of plates 120, but, in the preferred embodiment, stop 172 is welded or otherwise rigidly and permanently attached between two adjacent plates 120. When wedge 146 is placed between bushing support 142 and support rod 140, thereby pressing support rod 140 against adjustable support 157 as shown in FIG. 2, stop 172 will be moved over block 174 so that any rotation of plates 120 about support rod 140 in the clockwise direction of FIG. 1 will be prevented by engagement between stop 172 and block 174. However, when wedge 146 separates support rod 140 from adjustable support 157, stop 172 will most preferably not engage with block 174. When so configured, plates 120 are free to rotate about support rod 140. As a third possible arrangement, which is not specifically illustrated in the figures, spacer 145 might not be used at all. When not used, support rod 140 will slide within bushing support 142 depending upon the orientation of bucket 200 and the resulting orientation of strips 151, 152. When strips 151, 152 are nearly horizontal, similar to that shown in FIGS. 2 and 3, it is apparent that bushing support 142 is sloped slightly upwards away from adjustable support 157. This will cause support rod 140 to self-orient as illustrated in FIG. 2. However, when strips 151, 152 are tilted downward sufficiently, bushing support 142 will no longer be tilted upward, and may, in fact, be tilted downward. In that case, support rod 140 will self orient as shown in FIG. 3, thereby allowing rotation of support rod 140. As will now be apparent, the use of bushing support 142 without wedge 146 allows teeth 114, 110 to be locked in place during normal material loading, and to self release during unloading, to assist with emptying of bucket 200. Furthermore, during rock-picking or scraping, forward motion will lock attachment 100 in place. Backward and downward motion of bucket 200 will then result in an unlocking, to allow attachment 100 to empty into bucket 200.

In operation, an operator must first determine whether teeth 110, 114 should be locked in place, or allowed to rotate. As discussed herein above, this decision determines the appropriate orientation of spacer 145 carrying wedge 146 therein. If the operator has elected to allow rods 110, 114 to rotate freely, then attachment 100 will be flipped to an unloading position by lowering bucket 200 until edge 132 engages with a surface such as the ground. Next, bucket 200 will be moved backwards and downward. This movement may be brought about either by hydraulic control alone, or hydraulic control in combination with movement of bucket 200 backwards, depending upon the capabilities of the specific equipment used to control bucket 200. Edge 132 will engage with the surface, and the continued movement of bucket 200 backwards and downward will lead to a rotation of edge 132 and consequent rotation of rods 110, 114 about a pivot formed by support rod 140. This rotation will come to an abrupt end when stop 122 engages adjustable support 157. Any material which is supported by rods 110, 114, will be forcefully thrown into bucket 200 when stop 122 engages with support 157. Smaller materials such as sand and small gravel will pass freely between each of the rods 110, space 114. Any finer material that may be propelled into bucket 200 may later pass between plates 120 and out of the front of bucket 200. Bucket 200 may also include a slotted floor to further assist with the release of the finer material.

Sliding adjustable support 157 relative to T-bar 155 allows the maximum tilt or angle formed by rods 114 to be adjusted, by controlling when stop 134 has traveled to its limit against strip 151. Lowering adjustable strip 157 allows edge 134 to rotate farther in a counter clockwise direction relative to support rod 140 before contacting strip 151. This, in turn, leads to a greater rotation of rods 114, also in a counter clockwise direction. Noteworthy is the fact that even though the limit set by stop 134 changes, this adjustment does not change the limit set by stop 122.

Figure 8:
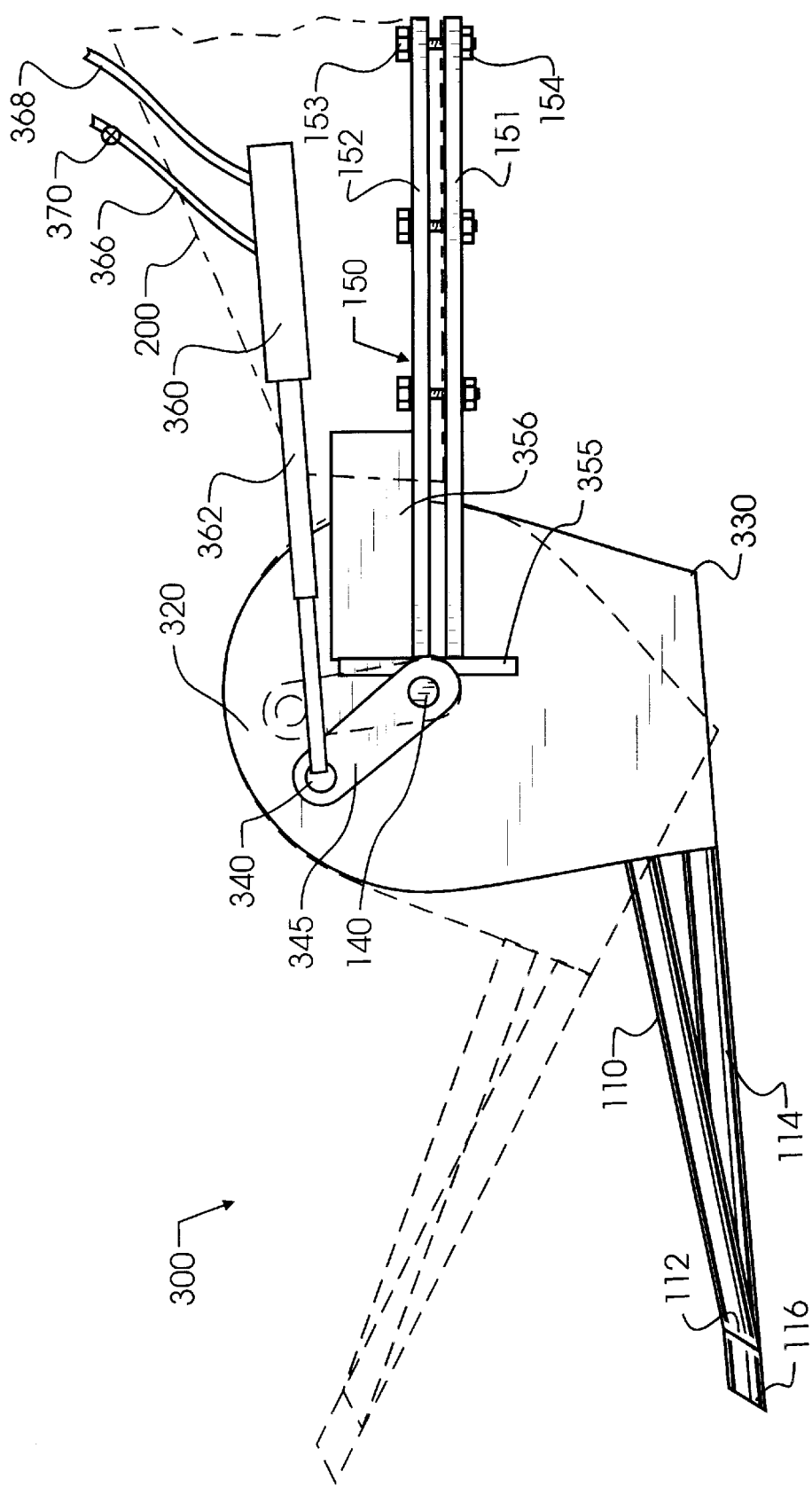
FIG. 8 illustrates an alternative embodiment hydraulically actuated loader attachment designed in accord with the present invention.

FIG. 8 illustrates an alternative embodiment hydraulically actuated material loader which incorporates many of the features and benefits of the present invention in an alternative form. As will be apparent to those skilled in the art, one or many of the features illustrated in FIG. 8 may be applied successfully to material loader 100. Consequently, FIG. 8 will be understood to provide only one of the myriad of possible combinations of components and features which are taught and disclosed herein. One of the primary differences between attachment 300 and attachment 100 is the application of two speed hydraulic cylinder 360 to the rotation of rods 110, 114. The use of a two speed hydraulic cylinder, such as cylinder 360, is very consequential to the operation of attachment 300. While various rock pickers and loaders of the prior have utilized hydraulic cylinders, a single speed hydraulic cylinder used in association with the remaining features of the invention will force an operator to either rotate rods 114 too quickly to manage fine position adjustment, or to rotate rods 114 too slowly to completely discharge material into bucket 200. Most preferably, two speed hydraulic cylinder 360 will move slowly when rods 110, 114 are approximately parallel to the ground. However, once rods 110, space 114 pass a threshold angle of rotation, such as illustrated by dashed lines in FIG. 8, two speed hydraulic cylinder 360 will most preferably accelerate to a higher second speed. This accelerated second speed will most preferably be adequate to gently toss material from rods 114 into bucket 200.

Flow restriction valve 370 may be provided in intake line 366 as illustrated, or in discharge line 368 as an alternative. Valve 370 may be used to limit the maximum speed of operation of cylinder 360. By restricting the flow of hydraulic fluid through lines 366, 368, extension arm 362 will not move as quickly.

Optionally, a small elbow 330 may still be provided. While not illustrated, elbow 330 may further optionally include a stop similar to stop 134 of attachment 100. Elbow 330 can be used to assist hydraulic cylinder 360 in the process of flipping attachment 300, by providing a mechanical motion of bucket 200, as described herein above with reference to attachment 100.

As is known in the hydraulics art, hydraulic cylinder 360 may most preferably include a means for adjustment of the length between bucket 200 and opening 340 and arm 345 when cylinder 360 is fully extended. The adjustment may be a simple threaded rod that adds or subtracts length from the attachment between cylinder 360 and bucket 200, for example. Regardless of the method, in practice when cylinder 360 is fully extended, this adjustment can be used to set the proper scraping angle.

While the foregoing details what is felt to be the preferred embodiment of the invention, no material limitations to the scope of the claimed invention are intended. Further, features and design alternatives that would be obvious to one of ordinary skill in the art are considered to be incorporated herein. In fact, a number of such alternatives have already been enumerated. However, a full and complete listing of all possible alternatives would not be practical within the content of these pages. Rather, the scope of the invention is set forth and particularly described in the claims hereinbelow.

What is claimed is:

1. An attachment for loading and unloading material in and out of a front-loader bucket controlled by an operator, while maintaining said material in full view of said operator when said operator is facing forward, comprising:
   a plurality of elongated teeth, said plurality of elongated teeth extending longitudinally forward from said front-loader bucket when in an operative position for engaging said material;
   a support extending transverse to said plurality of elongated teeth and adjacent a leading edge of said front loader bucket when in said operative position for engaging said material;
   a plurality of relatively planar sheets spaced equidistantly along said support and extending above said leading edge of said front loader bucket when in said operative position for engaging said material and having ones of said plurality of elongated teeth positioned between ones of said plurality of relatively planar sheets, said plurality of relatively planar sheets extending parallel to said elongated teeth, edge-wise to said full view of said operator, and said support extending normal to said relatively planar sheets;
   whereby said plurality of relatively planar sheets provide support for said plurality of elongated teeth and form a barrier cooperatively with said front-loader bucket while maintaining said full view.

2. The attachment of claim 1 wherein single ones of said plurality of relatively planar sheets are adjacent on a first major surface with a single one of said plurality of elongated teeth and not adjacent on a second major surface to said plurality of elongated teeth.

3. The attachment of claim 1 further comprising a pivot cooperatively engaged with said support and allowing said support to serve as an axis of rotation about which said plurality of relatively planar sheets and said plurality of elongated teeth rotate, whereby an orientation of said relatively planar sheets and said plurality of elongated teeth may be changed relative to said front-loader bucket.

4. The attachment of claim 3 further comprising a first stop which limits angular rotation of said attachment relative to said front-loader bucket in a first direction and a second stop which limits angular rotation of said material loader relative to said loader bucket in a second direction.

5. The attachment of claim 1 further comprising a two speed hydraulic cylinder for rotating said plurality of elongated teeth from a first relatively horizontal orientation at a first speed of said two speeds through an intermediate orientation where said two speed hydraulic cylinder changes to a second speed of said two speeds which is less than said first speed, whereby adjustment of said horizontal orientation occurs at a lower speed than an emptying of said elongated teeth.

6. An attachment for loading and unloading material in and out of a loader bucket controlled by an operator, while maintaining said material in full view of said operator, comprising:
   a plurality of elongated teeth said plurality of elongated teeth extending from said loader bucket when in an operative position for engaging said material;
   a support extending transverse to said plurality of elongated teeth;
   a plurality of sheets spaced along said support and extending above said leading edge of said front loader bucket when in said operative position for engaging said material and having ones of said plurality of elongated teeth positioned between ones of said plurality of sheets, said plurality of sheets extending parallel to said elongated teeth, and said support extending normal to said sheets;
   whereby said plurality of sheets provide support for said plurality of elongated teeth and form a barrier cooperatively with said loader bucket while maintaining said full view of said operator.

7. The attachment of claim 6 wherein single ones of said plurality of sheets are adjacent on a surface with a single one of said plurality of elongated teeth and not adjacent on a second surface opposite said first surface to said plurality of elongated teeth.

8. The attachment of claim 6 further comprising a pivot cooperatively engaged with said support and allowing said support to serve as an axis of rotation about which said plurality of sheets and said plurality of elongated teeth rotate, whereby an orientation of said sheets and said plurality of elongated teeth may be changed relative to said loader bucket.

9. The attachment of claim 8 further comprising a first stop which limits angular rotation of said attachment relative to said loader bucket in a first direction and a second stop which limits angular rotation of said material loader relative to said loader bucket in a second direction.

10. The attachment of claim 6 further comprising a two speed hydraulic cylinder for rotating said plurality of elongated teeth from a first relatively horizontal orientation at a first speed of said two speeds through an intermediate orientation where said two speed hydraulic cylinder changes to a second speed of said two speeds which is less than said first speed, whereby adjustment of said horizontal orientation occurs at a lower speed than an emptying of said elongated teeth.

* * * * *